Dec. 28, 1948.  I. L. OWENS  2,457,395
BOAT TRAILER
Filed June 5, 1947  5 Sheets-Sheet 1
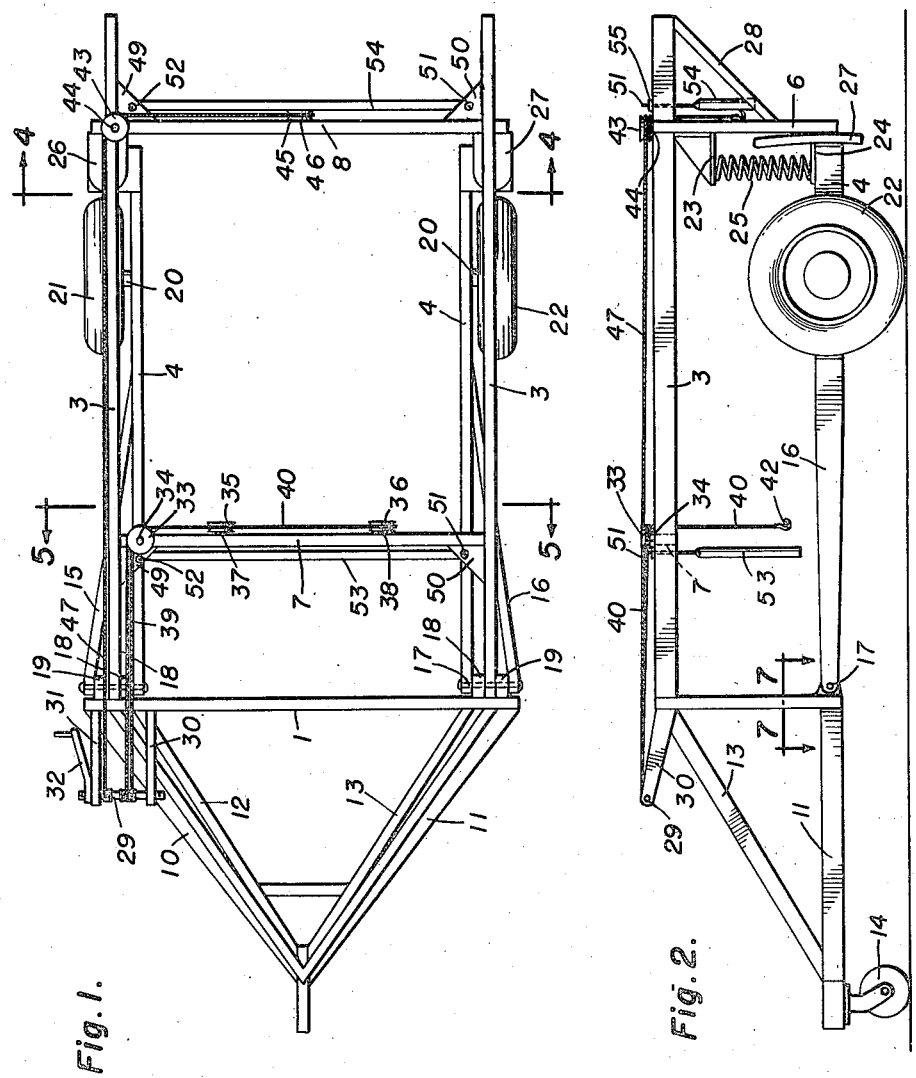
Inventor
Ivan L. Owens
By Clarence A. O'Brien
and Harvey B. Jacobson
Attorneys

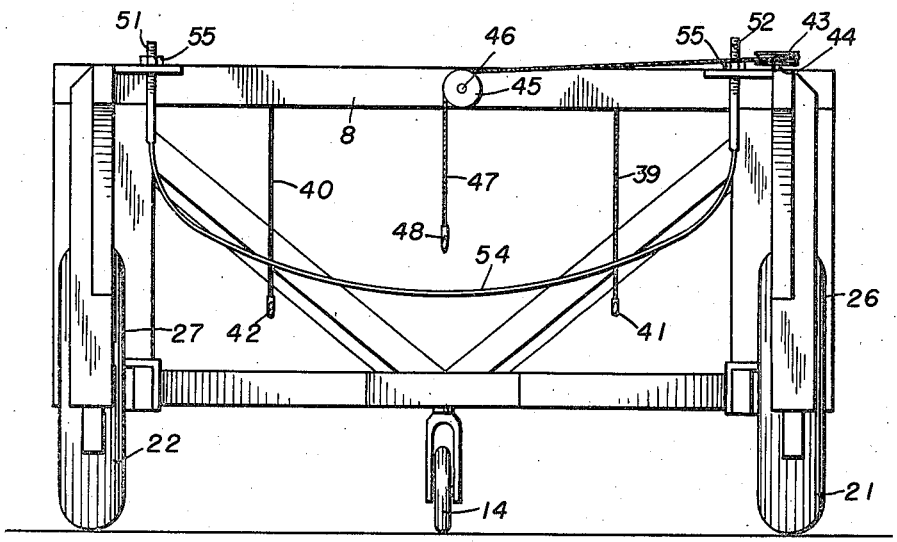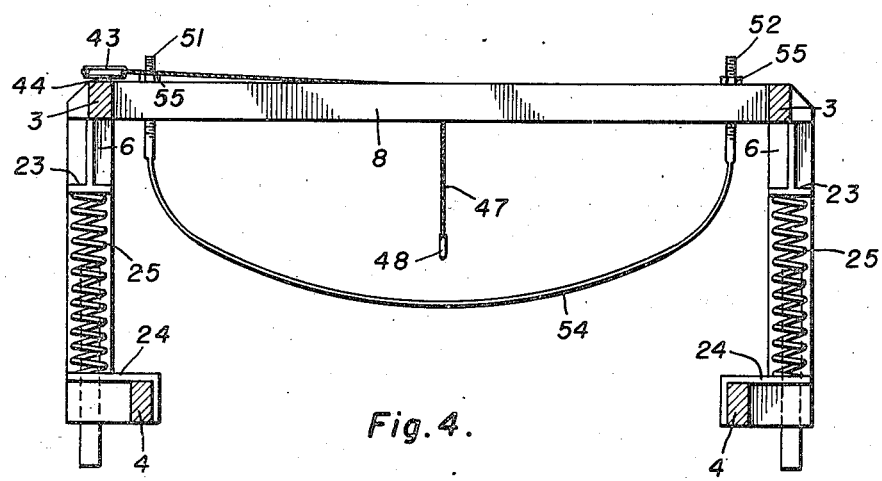

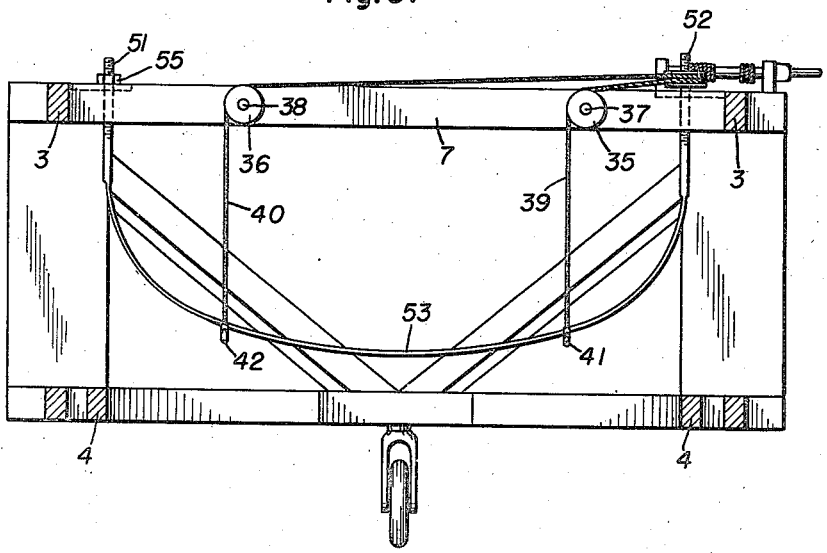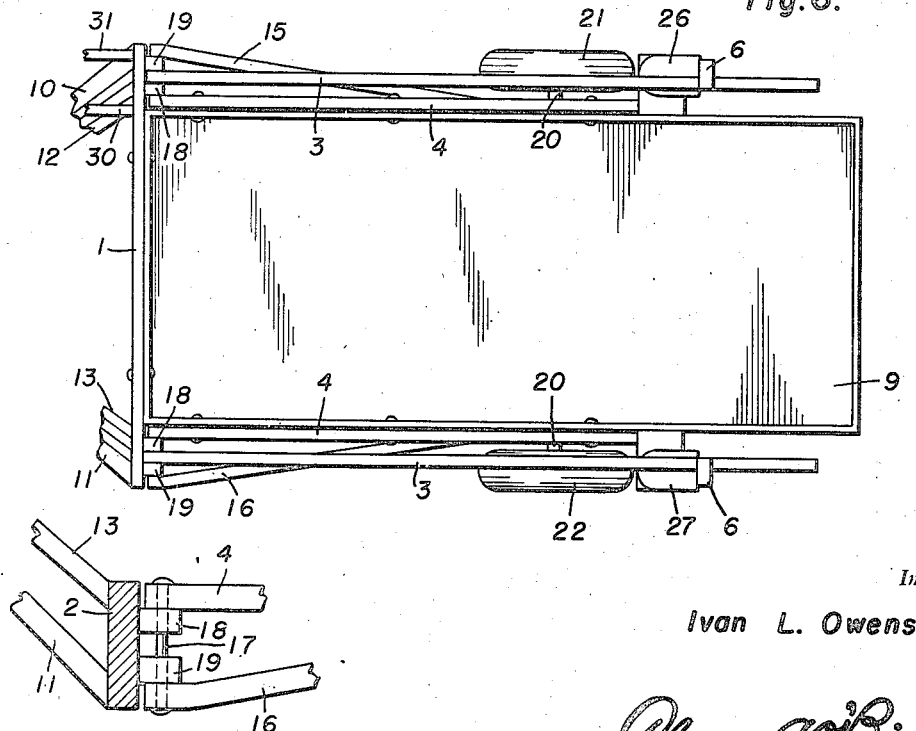

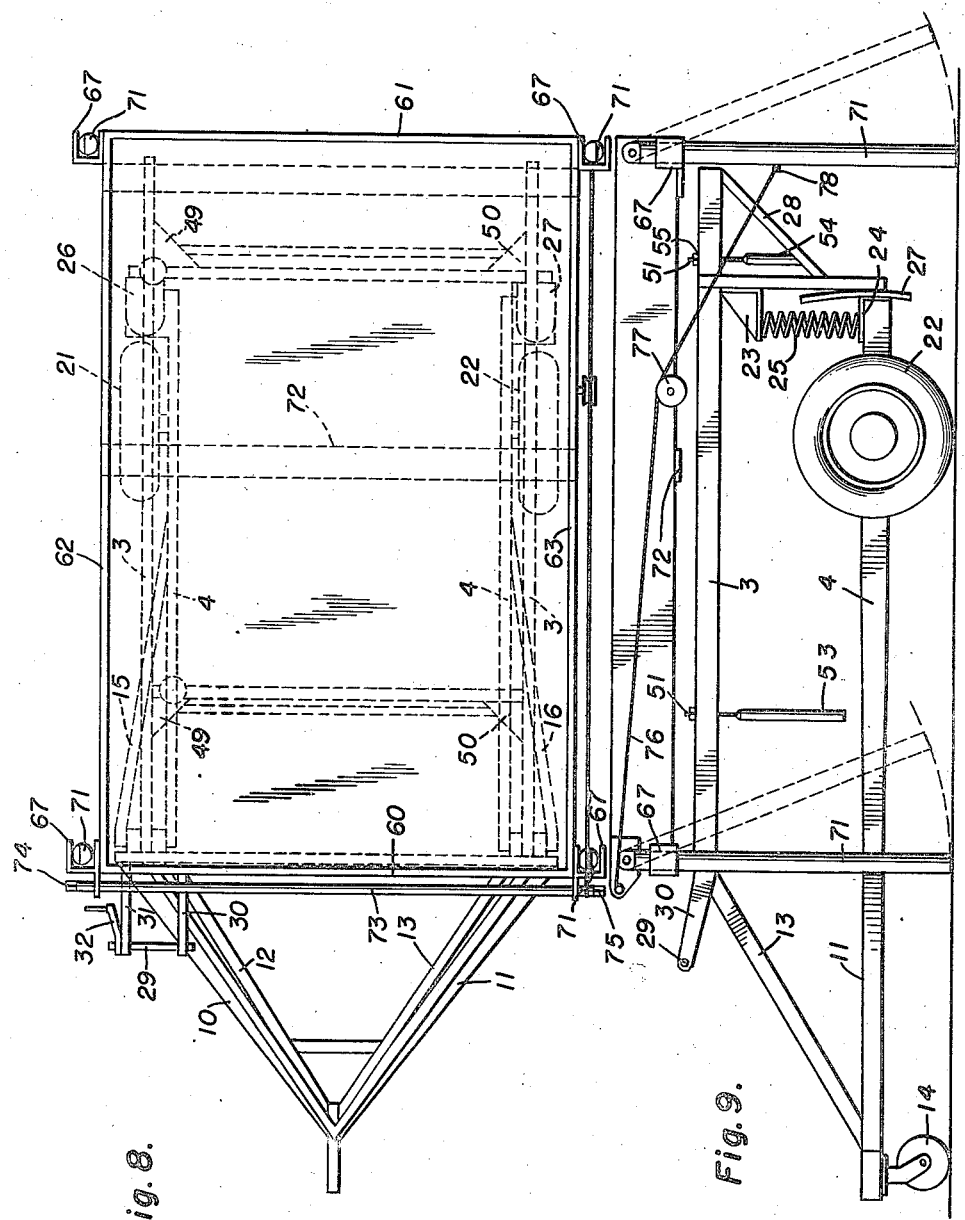

Dec. 28, 1948.   I. L. OWENS   2,457,395
BOAT TRAILER
Filed June 5, 1947   5 Sheets-Sheet 5

Inventor
Ivan L. Owens
By
Attorneys

Patented Dec. 28, 1948

2,457,395

UNITED STATES PATENT OFFICE 2,457,395

BOAT TRAILER

Ivan L. Owens, Detroit, Mich.

Application June 5, 1947, Serial No. 752,608

7 Claims. (Cl. 214—65)

This invention relates to improvements in boat trailers.

An object of the invention is to provide an improved boat trailer which will be wheel supported and have means for lifting a boat from the ground after the trailer has been rolled to overlie the boat, after which adjustable supporting straps or bands will be secured below the boat to hold the same suspended from said trailer in elevated position above the ground.

Another object of the invention is to provide an improved wheel supported boat trailer which will be attached to a motor vehicle for hauling the same, and will include a hand operated reel over which cables will be disposed for attaching to a boat for lifting the same from the ground to the desired height, after which adjustable supporting straps or bands will be secured below the boat to suspend the same from said trailer while the boat is out of water or being moved from one place to another.

A further object of the invention is to provide an improved three wheel supported boat trailer for attaching to an automobile whereby a boat may be raised from off the ground by means of a series of cables and a manually operated drum or reel to be supported by the bed frame of said trailer, and the cross braces of said trailer being removable, whereby a wagon bed may be supported by said trailer for hauling any desired objects.

A still further object of the invention is to provide a three wheel supported boat trailer having means for elevating a boat and supporting the same from said trailer, and the provision of a bed disposable over the top of the trailer frame including pivoted legs connected by means of a cable and operating shaft rotatably mounted at the front of said bed whereby the collapsed legs may be lowered to rest upon the ground to support a boat in elevated position, after which the trailer may be removed from under the bed.

Another object of the invention is to provide a boat trailer which will be highly efficient in operation, and relatively inexpensive to manufacture and produce.

Other objects will appear as the description proceeds.

In the accompanying drawings which form a part of this application,

Figure 1 is a plan view of the improved boat trailer;

Figure 2 is a side elevation of the improved wheel supported boat trailer;

Figure 3 is a rear view of the improved three wheel supported boat trailer;

Figure 4 is a partial sectional view taken on the line 4—4 of Figure 1;

Figure 5 is a partial sectional view taken on the line 5—5 of Figure 1;

Figure 6 is a plan view of the improved three wheel boat trailer with cross braces removed and a wagon bed supported therein;

Figure 7 is an enlarged sectional detail view taken on the line 7—7 of Figure 2;

Figure 8 is a plan view of the improved three wheel supported boat trailer with collapsible bed frame disposed over the trailer;

Figure 9 is a side elevation of the bed frame with legs extended to support the same above the boat trailer;

Like characters of reference are used throughout the following specification and the accompanying drawings to designate corresponding parts.

Figure 10:
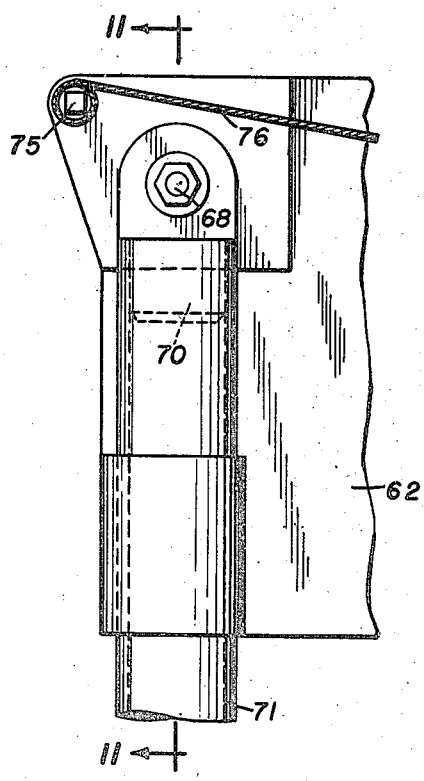
Figure 10 is an enlarged detail view of one of the pivoted bed frame supporting legs showing the cable operating means for operating the same.

In carrying out the invention, there is provided an improved boat trailer including a subtantially U-shaped trailer body having a frame formed with transversely extending front upper and lower members 1 and 2 and oppositely disposed upper and lower side members 3 and 4, the same being connected together by means of the front and rear corner posts 5 and 6. Transversely extending front and rear brace members 7 and 8 are provided and are removably connected between the upper side members 3 for removal when a wagon bed generally designated by the reference numeral 9 is to be supported upon the trailer, as shown in Figure 6 of the drawings.

Forwardly and inwardly extending front members 10 and 11 are secured to the lower member 2, while downwardly extending bracing members 12 and 13 connect the outer ends of the front member 1 with the junction of the members 10 and 11.

A front wheel 14 is swivelly mounted at the forward end of the angularly extending members 10, 11, 12 and 13, and a clevis (not shown) may be provided whereby the boat trailer may be attached to an automobile and pulled thereby.

The rearwardly and inwardly extending bracing members 15 and 16 are bolted by the bolts 17 to the lower side members 4 and to the spaced lugs 18 and 19, as are the forward ends of the lower side frame members 4.

Stub axles 20 are supported towards the rear of the lower side members 4, and support the rubber tired wheels 21 and 22.

Upper webbed brackets 23 are secured to the upper ends of the rear corner parts 6, while lower brackets 24 are secured upon the rear ends of the lower side frame members 4. Heavy coil springs 25 are supported between said brackets 23 and 24 to cushion the trailer when it is being hauled.

Arcuate vertically extending mud guards 26 and 27 are supported by the lower brackets 24 to the rear of the wheels 21 and 22.

Upwardly angled rear brace members 28 will be connected between the rear corner posts 6 and the rear ends of the upper side frame members 3, as clearly shown in Figure 2 of the drawings.

A reel or drum 29 will be rotatably supported by the forwardly extending bracket arms 30 and 31, and will be operated by the hand crank 32 secured to its outer end.

A pulley 33 will be mounted on a vertical supporting pin 34 on the front brace member 7, while the spaced pulleys 35 and 36 will be supported on the horizontal pins 37 and 38 respectively. Cables 39 and 40 will be secured to the reel or drum 29 and will extend about the pulleys 33, 35 and 36, to hang below the same and to support the hooks 41 and 42 for attaching to a boat when the same is to be lifted from the ground.

A pulley 43 will be mounted upon the vertical pin 44 on the rear brace member 8, while a pulley 45 will be mounted on the horizontal pin 46 on the central rear surface of said member 8, and will support the cable 47 whose forward end is secured to the drum or reel 29 and whose rear end supports the lifting hook 48.

Corner webs 49 and 50 will be supported at the opposite ends of the transverse front and rear brace members 7 and 8, and will be apertured (not shown) to receive the threaded bolt ends 51 and 52 of the metal boat hull supporting strips or straps 53 and 54 which are placed below a boat hull (not shown) after the same has been raised the desired distance from the ground by means of the drum or reel 29 and the cables and hooks connected thereto and operated thereby. Nuts 55 will be disposed over the bolt ends 51 and 52 to hold the straps 53 and 54 in fixed position.

Figure 11:
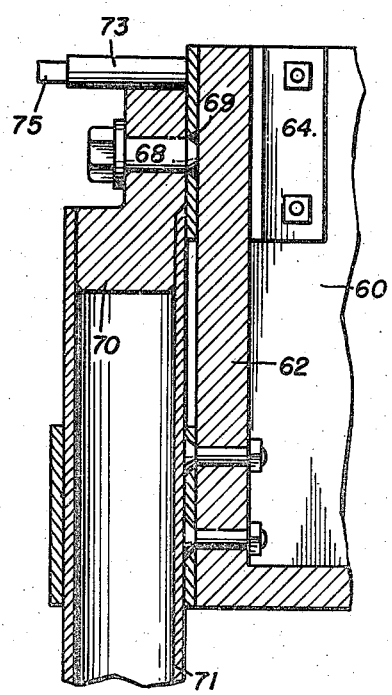
Figure 11 is a sectional view taken on the line 11—11 of Figure 10.
Figure 12:
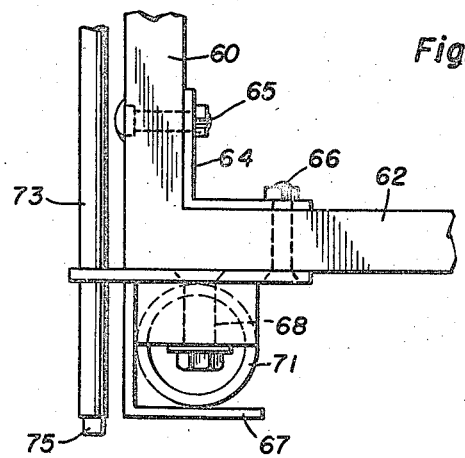
Figure 12 is a plan view of a corner of the bed frame disposable above the improved boat trailer.

In Figures 8 to 12 inclusive there is illustrated a detachable bed which may be put on top of the trailer when it is being used as a boat trailer, the bed comprises a rectangular frame having front and rear members 60 and 61 and longitudinally extending side members 62 and 63. Angle braces 64 will be disposed in the corners of the bed, being secured by means of the bolts 65 and 66, and the bolts 66 will also secure the U-shaped bearing brackets 67 to the side members 62 and 63. Pivot bolts 68 will be supported by the brackets 67, being welded thereto as at 69. Filler blocks 70 will be pivotally supported on the pivot bolts 68 and will be secured in the upper ends of the tubular legs 71 to pivotally support the same.

A cross brace member 72 will be secured between the side members 62 and 63 of the detachable bed.

An elongated rotatable reel rod 73 will be rotatably supported by the front bed frame member 60 and will have squared ends 74 and 75 for receiving the operating crank 32. A cable 76 will be secured to the reel rod 73 and will extend rearwardly over the pulley 77, to connect with the eye 78 on the pivoted leg, as clearly shown in Figure 9 of the drawings, whereby the legs may be pulled to their upright or supporting position. When the detachable bed is in position, the trailer may be readily run under the same when it is desired to raise the legs of the bed and support the same on the trailer frame.

From the foregoing description it will be apparent that a highly efficient boat trailer will have been devised and provided, which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A boat trailer comprising a substantially rectangular frame having depending corner legs supported thereby, lower side frame members pivotally supported at their forward ends to the front of said frame, supporting wheels mounted on said side frame members, a swivel wheel mounted forwardly of said frame, means on said frame for raising a boat from the ground, means disposable below the boat having its opposite ends attached to said frame for supporting said boat in elevated position, and a detachable bed frame having pivoted foldable legs disposed at the corners thereof.

2. The combination of claim 1 and a reel supported by said bed frame and a cable connected between said reel and said foldable legs.

3. The combination of claim 1 and a reel and pulleys supported on said frame, and cables secured to said reel disposable about said pulleys having boat engaging hooks on their terminal ends.

4. The combination of claim 3 and a reel supported by said bed frame and a cable connected between said reel and said foldable legs.

5. The combination of claim 1 and cushioning springs disposed between the rear ends of said lower side frame members and said frame.

6. The combination of claim 5 and a reel and pulleys supported on said frame, and cables secured to said reel disposable about said pulleys having boat engaging hooks on their terminal ends.

7. The combination of claim 6 and a reel supported by said bed frame and a cable connected between said reel and said foldable legs.

IVAN L. OWENS.

REFERENCES CITED

The following references are of record in the file of this patent:

UNITED STATES PATENTS

| Number | Name | Date |
|---|---|---|
| 1,531,180 | Erickson | Mar. 24, 1925 |
| 1,609,625 | Lawes | Dec. 7, 1926 |
| 2,304,622 | Barrett | Dec. 8, 1942 |
| 2,415,771 | Van Agtmael | Feb. 11, 1947 |
| 2,427,667 | Gilbert | Sept. 23, 1947 |
| 2,442,994 | Clary | June 8, 1948 |